UNITED STATES PATENT OFFICE.

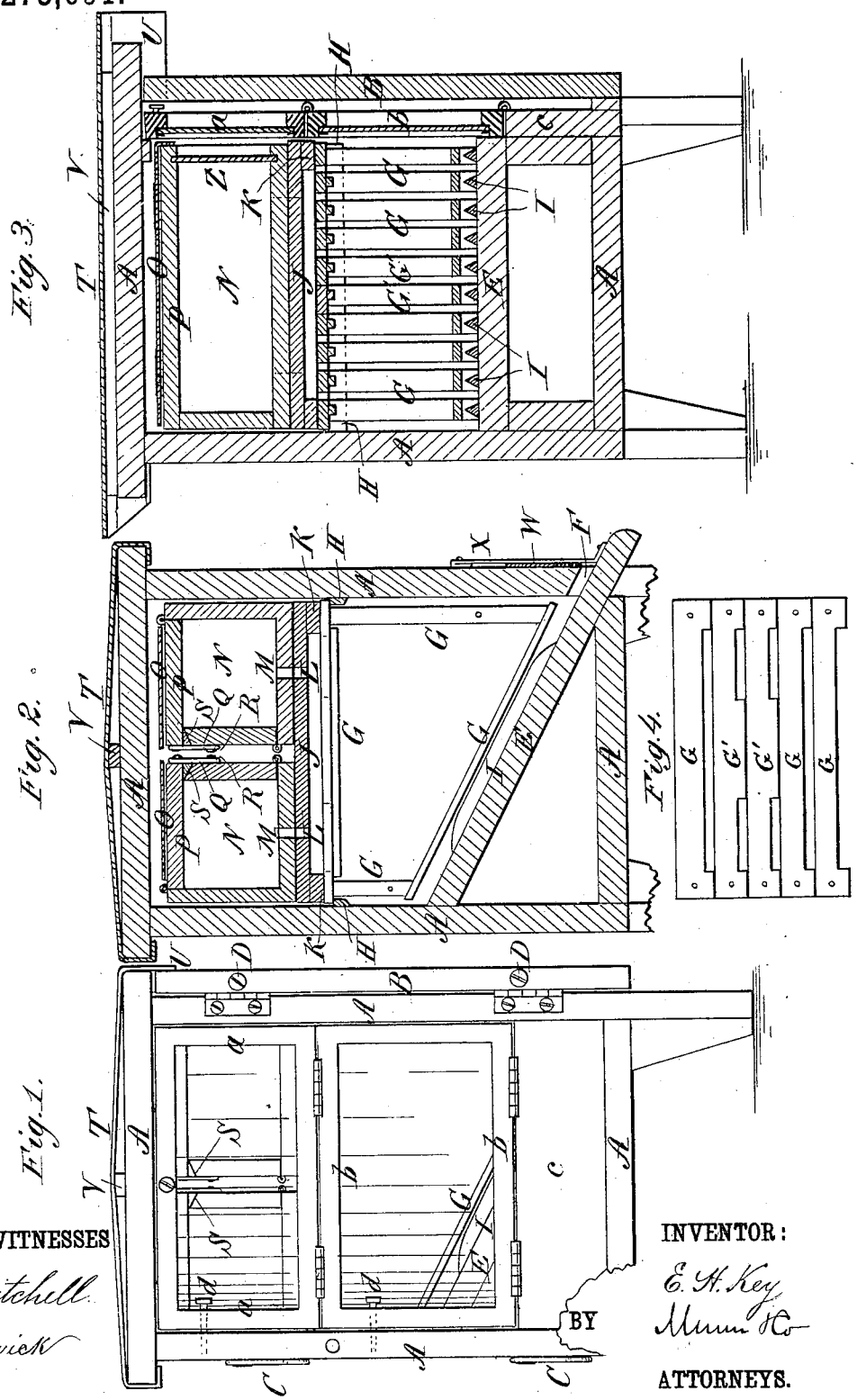

ERASMUS H. KEY, MAYFIELD, KENTUCKY.

BEE-HIVE.

SPECIFICATION forming part of Letters Patent No. 273,691, dated March 6, 1883.

Application filed July 3, 1882. (Model.)

*To all whom it may concern:*

Be it known that I, ERASMUS H. KEY, of Mayfield, in the county of Graves and State of Kentucky, have invented a new and useful Improvement in Bee-Hives, of which the following is a full, clear, and exact description.

Reference is to be had to the accompanying drawings, forming part of this specification, in which similar letters of reference indicate corresponding parts in all the figures.

Figure 1 is a side elevation of my improvement, shown with the outer door open. Fig. 2 is a sectional side elevation of the same. Fig. 3 is a sectional rear elevation of the same. Fig. 4 is a plan view of a portion of the comb-frames.

The object of this invention is to promote convenience in the care of bees; and to this end the invention consists in the peculiar construction and arrangement of parts, as hereinafter fully described, and pointed out in the claims.

A represents the case or body of the hive, one side, B, of which is made separate, and is hinged at its forward edge to the side edge of the front wall of the said hive, so that when open the said door will serve as a guard or screen to separate the person opening the door from the bees flying about the front of the hive. The door B is secured in place, when closed, by hooks C, pivoted to the rear wall of the hive, and which engage with screws D or other catches attached to the edge of the said door. The hive is provided with a steeply-inclined bottom, E, which projects beneath the lower edge of the front wall of the hive, to serve as a ledge or platform for the bees. The entrance for the bees is a long slot, F, formed between the lower edge of the front wall of the hive and the bottom E. By this construction the bee-droppings and other trash falling upon the inclined bottom E will slide down the said bottom and pass out through the entrance-opening F.

G G' are the comb-frames, the projecting ends of the top bars of which rest upon cleats H, attached to the front and rear walls of the hive A. The frames G are made with a long front bar and a short rear bar, so that the bottom bars will be parallel with the inclined bottom E. To the bottom E are attached cleats I in such position as to be beneath spaces between the frames G G' and parallel with the bottom bars of the said frames. The cleats I are beveled upon their sides, and are tapered toward their ends, as shown in Figs. 1, 2, and 3, and are intended for the bees to climb upon to reach the bottom bars of the comb-frames G G', so that they will not build mounds of wax for this purpose, which mounds obstruct the escape of trash and form lurking places for insects. The side edges of the top bars of the comb-frames G are recessed on one side, nearly from end to end, forming long slots between the said top bars, and the frames G' have their top bars recessed on one side from near the center to each end, forming short slots for the passage of the bees. By this construction at the central part of the brood-chamber a solid portion will be left by the uncutaway portions of the comb-frames G' coming in contact with each other and one of the comb-frames G, as shown in Figs. 3 and 4, so that the bees will begin to work in the middle part of the hive.

Upon the top of the comb-frames G G' is placed the honey-board J, which has cleats K, attached to the lower side of its edges, to rest upon the top bars of the frames G G', and thus allow the bees to pass between the said honey-board J and the tops of the comb-frames G G'. In this honey-board J are formed slots L in such positions as to be directly beneath corresponding slots M in the bottoms of the surplus-honey boxes N, placed upon the said honey-board J, so that the bees can pass freely from the brood-chamber to the said honey-boxes. When it is desired to prevent the bees from entering the honey-boxes sheet-metal plates O are slipped in between the said honey-boxes N and the honey-board J. When not required for use, the slides O are placed upon the tops of the honey-boxes, as shown in Figs. 2 and 3.

The tops P of the honey-boxes N are made separate, and are hinged at their rear edges to the upper edge of a side of the said boxes, as shown in Fig. 2. The hinged tops or covers P of the honey-boxes N have hooks Q, attached to their forward edges, which hook upon screws R or other catches attached to the forward sides of the boxes N. The upper edges of the forward sides of the honey-boxes N are beveled, and in the triangular spaces thus formed are placed triangular strips S, which are kept in place by the covers P and hooks Q. With this construction, when the hooks Q are unfastened, the strips S can be removed, and a knife can be inserted through the spaces thus left open to separate the covers P from the comb, the covers being gradually opened as the separation is continued, so that the boxes N can be opened without injuring the combs contained in them.

Upon the top of the hive A is placed a sheet-metal plate, T, the front and rear edges of which are bent downward and inward around the projecting edges of the said top, except at the forward corner next the door B, where a flange, U, projects to serve as a stop for the said door B, to prevent it from being opened farther than into line with the front of the hive. The side edges of the covering-plate T are not bent down, and the middle part of the said plate is raised by a cleat, V, interposed between it and the top of the hive, so as to form a chamber through which the air can circulate to prevent the top of the hive from becoming unduly heated.

The entrance-passage F is closed, when desired, by a plate, W, when placed against the forward side of the hive A, and which slides up and down to uncover and cover the said passage in keepers X, attached to the said forward side of the hive. The lower part of the plate W is perforated with numerous small holes, to allow air to enter the hive when the said plate is lowered.

The honey-boxes N are provided with glass forward ends Z, to allow the contents of the said boxes to be inspected without opening their covers P. The ends of the honey-boxes N are covered with a door, a, having a glass panel, and which is hinged at its lower edge to the upper edge of a similar glass-paneled door, b. The door b covers the comb-frames G G', and is hinged at its lower edge to a side board, c, attached to the hive or to some other suitable support. The doors a b are secured in place, when closed, by pins d passing through holes in their side bars and entering holes in the walls of the hive, as shown in Fig. 1. With this construction the door B can be opened and the condition of the hive inspected without exposing or disturbing the bees. With this construction also the upper door, a, can be opened to obtain access to the honey-boxes N without opening the lower door, b; or both doors can be opened when it is desired to have access to the brood-chamber. With this construction the outer door, B, covers and protects the inner glass-paneled doors, a b, and allows the light to be shut out of the hive.

Having thus fully described my invention, what I claim as new, and desire to secure by Letters Patent, is—

1. In a bee-hive, the combination, with the inclined bottom E and the comb-frames G, of the beveled and tapered cleats I, substantially as herein shown and described, whereby the bees can readily reach the comb-frames, as set forth.

2. In a bee-hive, the combination, with the beveled edge of the front side of the honey-boxes N, the hinged covers P, and the fastening-hooks Q, of the removable triangular strips S, substantially as herein shown and described, whereby a knife can be readily inserted to separate the said hinged covers from the comb and allow the covers to be raised without injuring the comb, as set forth.

3. In a bee-hive, the combination, with the outer comb-frames, G, having the edges of their top bars recessed on one side nearly from end to end, of the center comb-frames, G', having the edges of their top bars recessed on one side from near the center to each end, leaving their middle portion solid, substantially as herein shown and described, whereby the bees are caused to begin to work in the center of the hive, as set forth.

4. In a bee-hive, the combination, with the case or body A, of the doors a b, hinged to each other and to the said case, and provided with glass panels, substantially as and for the purpose set forth.

5. In a bee-hive, the combination, with the case or body A, and the doors a b, hinged to each other and to the case, and provided with glass panels, of the door B, hinged to the edge of the front wall of said case, substantially as and for the purpose set forth.

6. In a bee-hive, the combination, with the case or body A and the hinged door B, of the sheet-metal plate T, provided with the flange U, and the supporting-cleat V, substantially as herein shown and described, whereby the said plate serves both as an air-space and a stop for the door, as set forth.

ERASMUS H. KEY.

Witnesses:
   THOS. J. FOLGAM,
   D. P. COULTER.